United States Patent [19]

Walker

[11] Patent Number: 4,790,061

[45] Date of Patent: Dec. 13, 1988

[54] MACHINING THE ENDS OF LENGTHS OF WIRE AND BAR AND SIMILAR WORKPIECES

[76] Inventor: Derek W. R. Walker, Four Gates, Hopstone, Claverley, Wolverhampton, England

[21] Appl. No.: 113,137

[22] Filed: Oct. 23, 1987

[30] Foreign Application Priority Data

Oct. 24, 1986 [GB] United Kingdom ............... 8625498

[51] Int. Cl.[4] .................. B23Q 7/02; B65G 47/00
[52] U.S. Cl. ...................... 29/563; 198/339.1; 198/478.1; 409/173; 414/745.9
[58] Field of Search .................. 29/33 T, 563, 564; 409/158, 198, 159, 221, 161, 173; 82/2.7, 101; 414/748; 198/478.1, 481.1, 479.1, 480.1, 339.1

[56] References Cited

U.S. PATENT DOCUMENTS

| | | | |
|---|---|---|---|
| 2,263,811 | 11/1941 | Lipkin | 198/478.1 |
| 3,400,837 | 9/1968 | Dalik | 414/748 X |
| 3,757,927 | 9/1973 | Gable et al. | 414/748 |
| 3,780,848 | 12/1973 | Studeny | 198/478.1 |
| 3,874,519 | 4/1975 | Mikami | 82/2.7 |
| 3,913,751 | 10/1975 | Friedman | 414/748 X |
| 4,205,566 | 6/1980 | Molnar | 198/481.1 |
| 4,388,989 | 6/1983 | Edmunds et al. | 198/339.1 |
| 4,516,307 | 5/1985 | Beard et al. | 29/564 |
| 4,529,083 | 7/1985 | Storimans | 198/478.1 X |

FOREIGN PATENT DOCUMENTS

301910 7/1971 U.S.S.R. ...................... 198/478.1

*Primary Examiner*—William R. Briggs
*Attorney, Agent, or Firm*—Oldham & Oldham Co.

[57] ABSTRACT

In an automatic bar and wire pointing machine, workpiece-feeding means comprises a carrier having two feeding wheels (38,40) mounted on a driving shaft (20). Each wheel comprises a circular pitch plate (42) providing four sets of six notches (N1, N2, N3, N4) spaced uniformly around its periphery; the notches form semi-circular recesses (R1, R2, R3, R4) of different diameters to accommodate different sizes of workpiece, and the recesses are all centered on a common pitch circle (P) of the pitch plate. The wheel comprises also a picker plate (44) comprising six lobes (66) which are spaced uniformly about the axis of the wheel and form radially-projecting edges (68) positioned adjacent to the notches of any selected one of the four sets of notches. Indexing means for rotating the carrier in uniform steps, successively to pick a workpiece from a rack (72), bring it to a machining position and deposit it on to an unloading ramp (74), comprises a treadwheel (82,84) secured to the driving shaft and having projecting spokes (102) to be engaged successively by an actuating cylinder (124).

10 Claims, 6 Drawing Sheets

MACHINING THE ENDS OF LENGTHS OF WIRE AND BAR AND SIMILAR WORKPIECES

This invention is concerned with apparatus for the automatic or semi-automatic removal of material from the ends of elongate workpieces such as lengths of wire, bar or tube. For example, such apparatus may be especially suitable for removing fraze or for pointing or tapering the ends of the workpieces.

Such apparatus is described, for example, in patent specification No. GB-A-2 149 702. The apparatus there described comprises two oppositely-aligned machining heads for machining the two ends of a workpiece simultaneously by means of rotary tools. The machining heads are of an orbital type, in which a tool holder in use is not only rotated about its own axis for rotation of the tool but is also rotated bodily in a closed path about an axis of orbit (aligned with the workpiece axis) to effect the removal of material by the tool all along an inner or outer periphery of the workpiece end. The apparatus comprises also workpiece-feeding means comprising a series of ramps and stops extending transversely of the apparatus, and lifting pads arranged to lift the workpieces over the stops on to the next ramp, so to deliver workpieces one at a time into a machining position between the machining heads and to remove workpieces from the machining position after machining.

It is an object of the present invention to provide such apparatus comprising improved means arranged to feed workpieces to and from a machining position.

The invention provides, in one of its aspects, apparatus for the automatic or semi-automatic removal of material from the ends of elongate workpieces such as lengths of wire, bar or tube, the apparatus comprising a machining head and workpiece-feeding means comprising a workpiece carrier arranged to carry a workpiece from storage and present it in a machining position at which the workpiece is held for one of its two ends to be machined by a tool mounted on the machining head, the carrier comprising a rotatable feeding wheel which has a plurality of peripheral workpiece-receiving notches which are uniformly distributed about the axis of the wheel and a plurality of workpiece-picking fingers which project radially adjacent to the notches for picking workpieces from storage and introducing then singly into the notches as the wheel rotates, the apparatus comprising also indexing means arranged to cause rotation of the feeding wheel in uniform indexing steps in order to bring workpieces successively to the machining position.

In a preferred arrangement, the feeding wheel comprises a workpiece-positioning member which has the notches formed at its periphery and a separate picker member which provides the fingers. The positioning member has at its periphery a plurality of sets of such notches (e.g. four sets of six notches each) for handling workpieces of different thicknesses, each set being made up of notches of the same size and there being the same number of notches in each set. The picker member is rotationally adjustably secured to the positioning member in order that the fingers can be positioned adjacent to the notches of any selected one of the sets of notches. Most preferably, the notches of the plurality of sets of notches are centered on a common pitch circle of the positioning member, so that each notch is arranged for bringing a workpiece to the same machining position.

The workpiece carrier may comprise two (or more) such feeding wheels, mounted coaxially for rotation in common by means of the indexing means, in order to support each workpiece at axially spaced positions along its length.

The apparatus may comprise two oppositely-aligned machining heads, in order that both ends of a workpiece held by the workpiece carrier at the machining position can be machined simultaneously. One or both of the machining heads is preferably movably mounted in order that the spacing between the heads can be varied to accommodate different lengths of workpiece. In a preferred arrangement, a feeding wheel is coupled to each of the machining heads in order that the spacing between the two wheels is determined by the spacing between the machining heads.

The indexing means may comprise a rotatably mounted treadwheel comprising a plurality of projecting spokes which are uniformly distributed about the axis of the treadwheel, there being the same number of spokes as there are workpiece-picking fingers of the or each feeding wheel of the carrier. The indexing means comprises actuating means (e.g. a pneumatic cylinder) arranged to engage the spokes in turn to rotate the treadwheel in the uniform indexing steps between stopped positions coinciding with the presentation of workpieces in the machining position by the workpiece carrier. Latching means may be provided to retain the treadwheel in the stopped position at the end of each of the indexing steps, and can conveniently comprise a retaining member which is resiliently urged to engage in a recess in the periphery of the treadwheel in each of the stopped positions of the treadwheel.

In a preferred arrangement, each of the spokes is pivotally mounted in the treadwheel to swing about an axis parallel with the treadwheel axis between an advanced position in which it engages a stop enabling it to be acted upon by the actuating means to rotate the treadwheel and a retracted position to which it falls as the treadwheel continues to rotate and in which the extent of its projection radially of the treadwheel is reduced. Such an arrangement can effectively reduce the height of the treadwheel (as opposed to the case if the spokes were fixed) giving benefits in the machine construction.

There now follows a detailed description, to be read with reference to the accompanying drawings, of a bar pointing machine which illustrates the invention by way of example.

Figure 1:
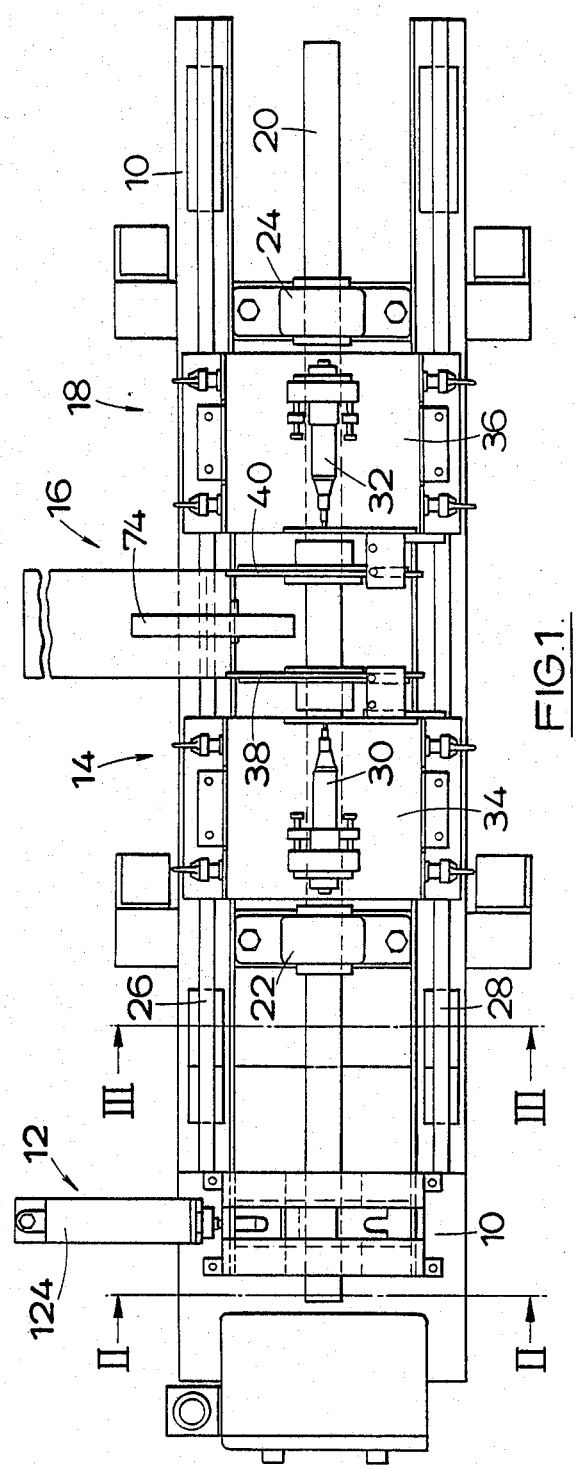
FIG. 1 is a plan view of the machine.

An automatic bar and wire pointing machine (FIGS. 1, 2 and 3) comprises a base 10, on which are mounted (successively from left to right, as viewed in plan in FIG. 1) an indexing assembly 12, a first machining unit 14, a workpiece-feeding assembly 16, and a second machining unit 18. A drive shaft 20 is mounted in spaced-apart bearings 22 and 24 secured to the base 10, the shaft extending along the length of the machine in parallel with a pair of horizontally spaced guide rails 26 and 28, also mounted on the base 10. The indexing assembly 12 and the feeding assembly 16 are mounted in fixed positions on the base, whereas the two machining units 14 and 18 are mounted on the rails 26 and 28 for adjustment of their positions to suit different lengths of workpiece to be handled by the feeding assembly 16; the two machining units comprise generally oppositely-aligned machining heads 30 and 32 for working on the opposite ends of a workpiece presented between them by the feeding assembly 16. As can be seen from FIGS. 1 and 3, the machining heads 30 and 32 are mounted on saddles 34 and 36 which extend between the rails 26 and 28 and over the shaft 20, to present the machining heads at a level (i.e. each at the same level) above the shaft 20.

The workpiece-feeding assembly 16 comprises a carrier arranged to pick workpieces singly from a storage rack positioned to one side of the machine, present them in turn to tools on the machining heads 30 and 32 for pointing of the workpiece ends, and deposit them after machining on to an unloading ramp for removal. The machining heads 30 and 32 are not to be described in detail herein, since their particular construction forms no part of the present invention, but they are of an orbital type arranged to operate in a general manner similar to that described in, for example, Patent Specification No. GB-A-2 149 702.

Figure 4:
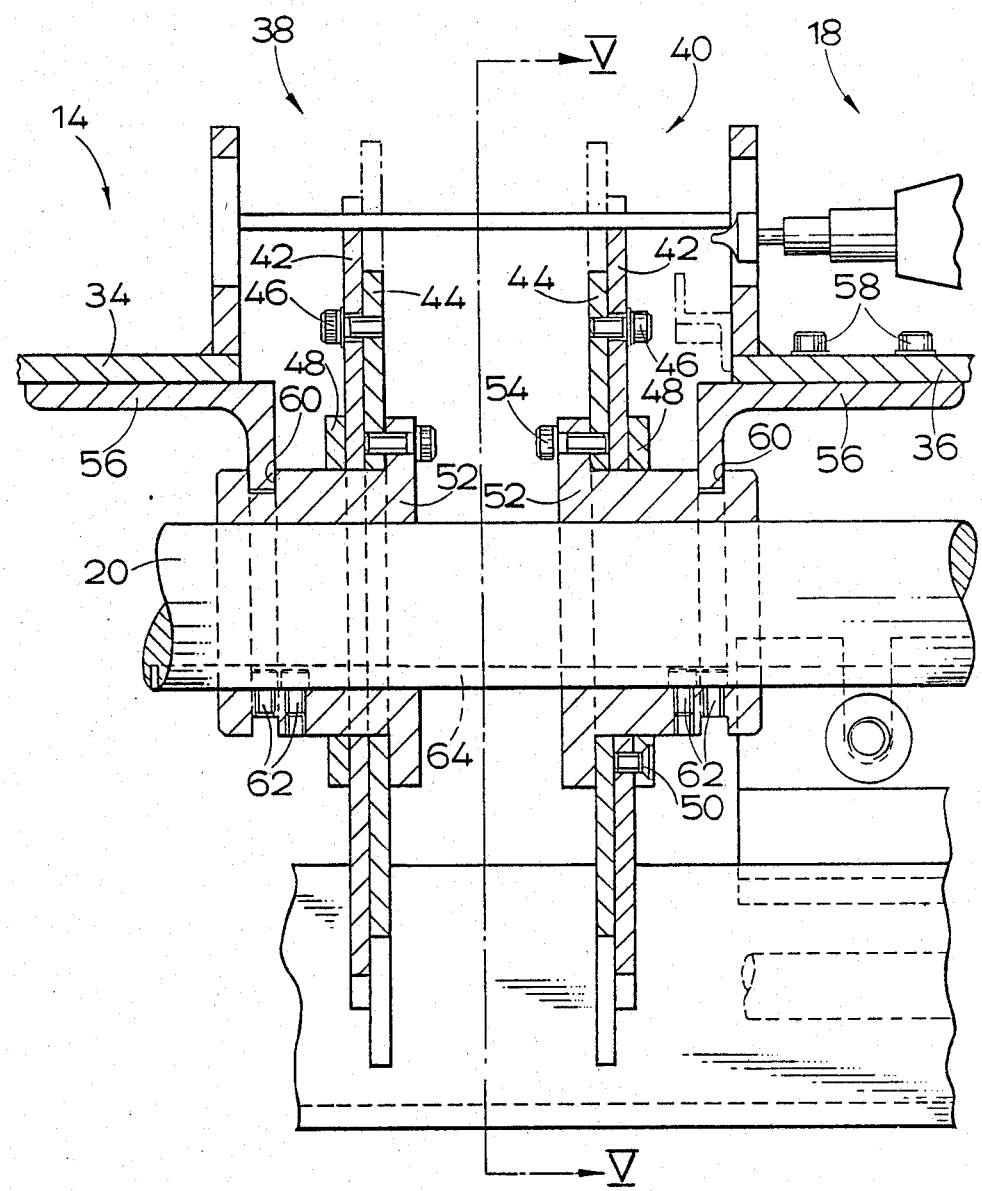
FIG. 4 is a side elevation in section, with one machining tool removed, showing feeding wheels of a workpiece-feeding assembly.
Figure 5:
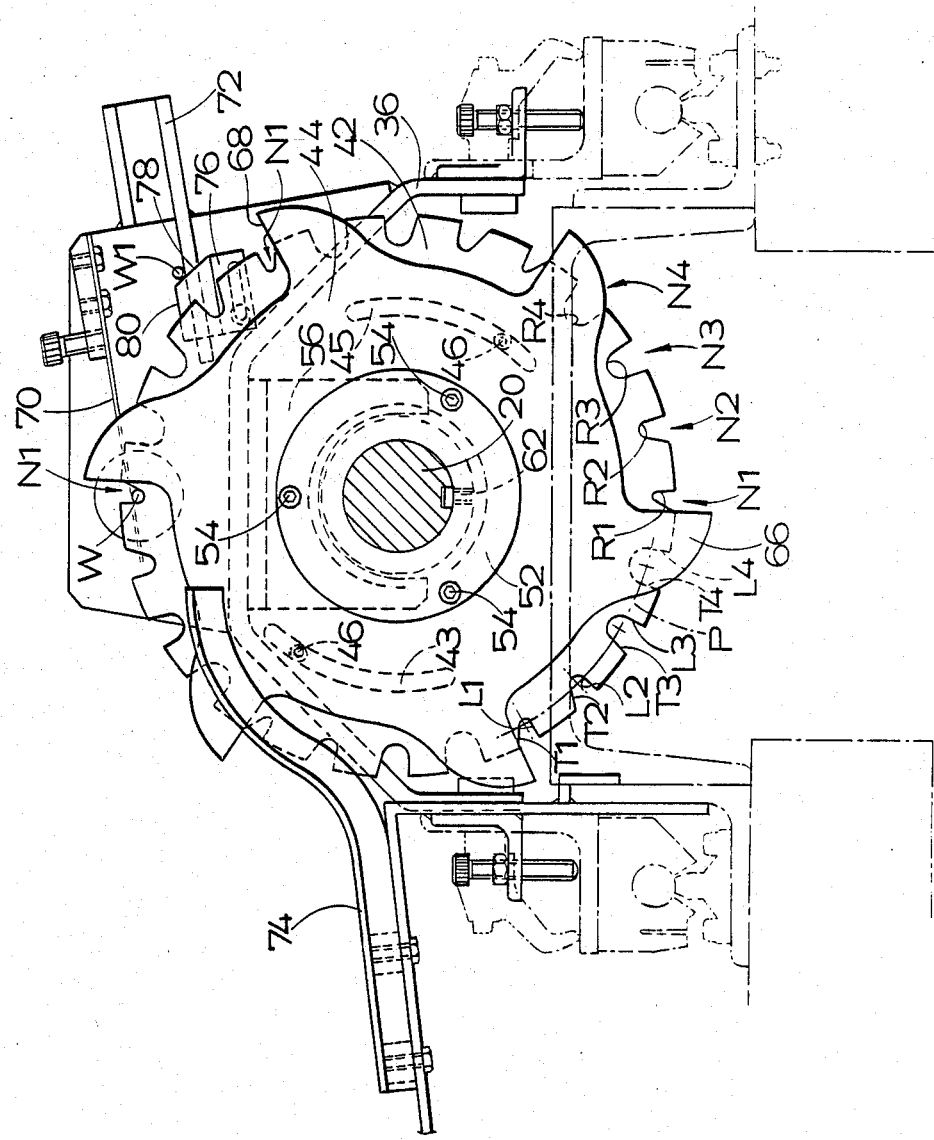
FIG. 5 is a view generally on Section V—V of FIG. 4, showing one feeding wheel positioned between a storage rack and an unloading ramp and opposite a machining head.

The feeding assembly 16 is shown in more detail in FIGS. 4 and 5. The carrier of the assembly comprises two feeding wheels 38 and 40 which are mounted on the drive shaft 20 at axially spaced-apart positions on the shaft. The wheels each comprise a workpiece-positioning member, in the form of a flat constant-pitch plate 42, and a flat picker plate 44; the two plates are secured together in rotationally adjusted position by means of screws 46 which extend through circumferentially-extending arcuate slots 43 and 45 in the pitch plate 42 (FIG. 5) into tapped holes in the picker plate 44. The pitch plate 42 is in fact in two equal and separable parts which are held together by means of a mounting ring 48 to which the plate halves are secured to screws 50. Each feeding wheel is mounted on a cylindrical boss 52 and secured to an annular head flange of the boss by screws 54. The boss is slidably mounted on the shaft 20, but is retained against axial movements by means of a coupling bracket 56 (secured to the adjacent machining unit saddle 34 and 36 by screws 58) which engages in a circumferential, slot 60 in the boss, and against rotation by the heads of keying screws 62 which are engaged in a keyway 64 of the shaft 20. The feeding wheels 38 and 40 of the workpiece carrier are so mounted and secured for coaxial rotations with the shaft 20, with the axial spacing between the wheels determined by the secured positions of the machining units 14 and 18 on the guide rails 26 and 28.

Details of the form of the feeding wheels 38 and 40 can be seen in FIG. 5; one only is shown in FIG. 5 but the two are the same in mirror image, and only one will be described. The picker plate 44 is of a generally circular form but comprises six radially-projecting fingers in the form of lobes 66. Each lobe 66 presents a straight, radially extending, leading-edge face 68 which projects beyond the periphery of the pitch plate 42. The six edge faces 68 are uniformly distributed, at 60° intervals, about the axis of the picker plate.

The pitch plate 42 can be considered notionally divided into six equal segments of 60° span each, about the axis of the plate. In each segment there are four notches N1, N2, N3 and N4 formed in the periphery of the plate, the bottom of each of the notches successively forming a semi-circular recess R1, R2, R3 and R4 (respectively) of a larger diameter than the previous one, and the four recesses each being centred on a common pitch circle P of the plate at 15° intervals about the axis of the plate. The patterns of notches in the six notional segments of the plate are identical, which means that each particular notch size (of the four sizes) is repeated regularly at 60° intervals. The notches have straight leading edges L1, L2, L3 and L4 aligned radially of the plate, and straight trailing edges T1, T2, T3 and T4. For all but the largest notch N4, the trailing edges T1, T2 and T3 are raked back to increase the width measured at the circumference of the plate from the radial recess centreline of the notch to the end of the adjacent trailing edge, to be the same for all four notches.

The pitch plate 42 and the picker plate 44 are assembled together with the six lobes 66 aligned with the set of six notches N1 of the appropriate size to match the diameter of a workpiece to be handled; the lobes are so aligned that their leading edge faces 68 are axially coincident with the trailing edges T1 of the notches at the periphery of the plate (see FIG. 5), so that a workpiece can be introduced between the edge face 68 and the edge L1 and will fall into the recess R1.

Whilst the pitch plate 42 can provide for any of four basic workpiece diameters, four other workpiece sizes it may be necessary to substitute a pitch plate with other recess diameters. The pitch plate is for this purpose in two parts, as hereinbefore described, to enable it to be removed and installed readily.

The recesses R in the two feeding wheels 38 and 40 are axially aligned so that a workpiece can be supported by them, towards each end, in parallel with the shaft 20 (see FIG. 4). The coaxial pitch circles P of the two wheels intersect an axis of orbit in common between the two machining heads 30 and 32, so that the axes of the recesses R (of whichever size) can be aligned with the orbital axis; a workpiece can so be presented in a machining position aligned with the orbital axis, appropriately positioned for its ends to be machined by the heads. A spring strip 70 (FIG. 5) is adjustably secured at a convenient position on each of the machining units 14 and 18 to bear down on to the workpiece to steady it during machining.

Figure 2:
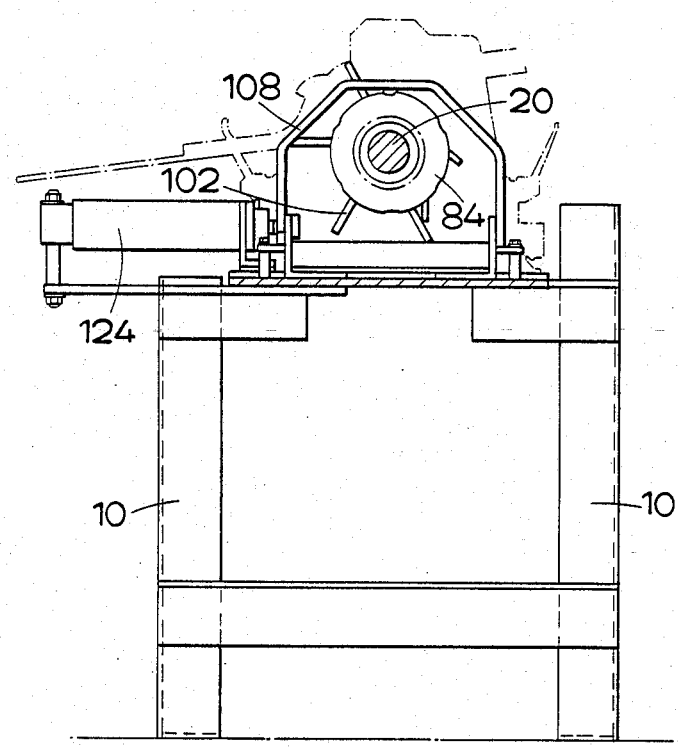
FIG. 2 is a schematic end view on Section II—II of FIG. 1.

Also shown in FIG. 5 is one of two side rails 72 of the workpiece storage rack, and the unloading ramp 74 (which can be seen also in FIG. 1). The two side rails 72 are suitably mounted on the machining units 14 and 18 to support workpieces awaiting machining. Each of the rails 72 is inclined downwards to an adjustably-positioned stop block 76, at which the stored workpieces become detained. As can be seen from FIG. 5, in which a brocken arrow has been introduced to show the path of the tip of an adjacent lobe 66 of the feeding wheel 40, a first workpiece W1 will become lifted by the lobe upon rotation of the wheel (anticlockwise, as seen in the drawing) and engagement of the leading edge face 68 with the workpiece. The workpiece will, with continued rotation of the wheel, be lifted up a short ramp face 78 of the block 76 on to an inclined top face 80 of the block, and so roll down into the notch N1 adjacent to that lobe of the wheel. Continued rotation of the feeding wheel will bring the workpiece to the machining position.

The unloading ramp 74 is positioned mid-way between the two feeding wheels 38 and 40. Upon continued rotation of the feeding wheels, moving a workpiece on from the machining position, the workpiece will be brought down on to the upper surface of the ramp by the movement of the wheels, and thereafter the ramp will serve to lift the workpiece out of the notch N1 as the wheels continue to rotate. Once radially clear of the leading edge L1 of the notch, the workpiece will roll away freely down the unloading ramp.

Figure 6:
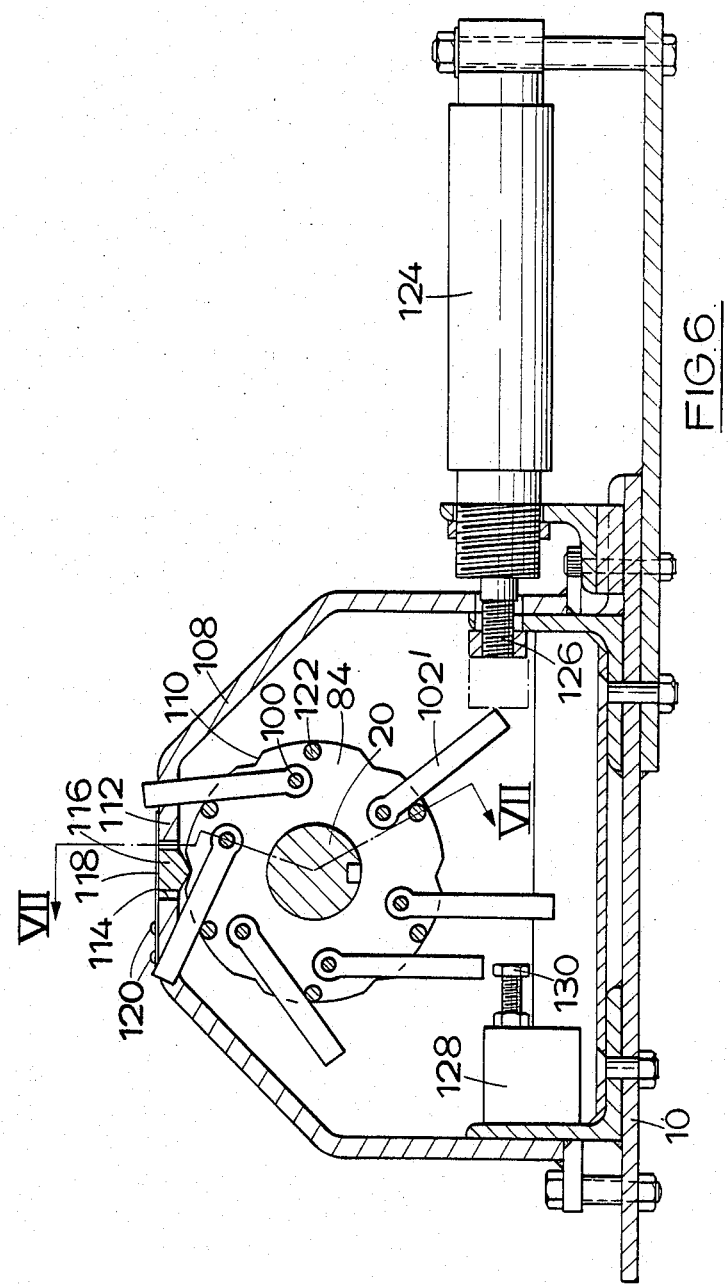
FIG. 6 is a sectional end view of an indexing assembly of the machine, in the opposite direction from FIG. 2.
Figure 7:
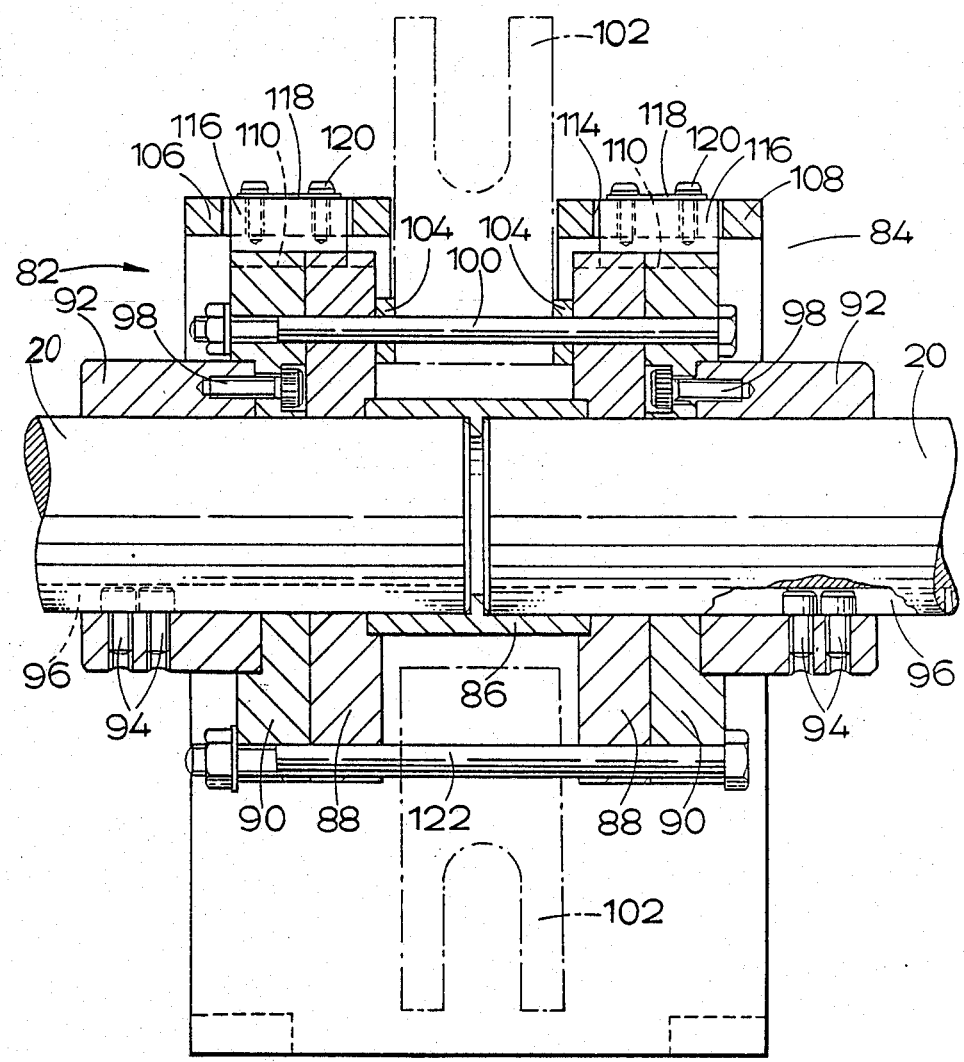
FIG. 7 is a side elevation of the indexing assembly, generally on Section VII—VII of FIG. 6.

The machine is arranged to rotate the feeding wheels 38 and 40 in indexing steps of 60°, in order to bring workpieces successively to the machining position. This is effected by means of the indexing assembly 12 (FIGS. 6 and 7).

The indexing assembly comprises a treadwheel having two supporting wheels 82 and 84 (FIG. 7) which are coaxially mounted on the shaft 20 and spaced apart axially by a spacing sleeve 86. [The shaft 20 of the machine may comprise discrete lengths, and two such lengths are shown meeting within the sleeve 86 of the assembly.]. Each supporting wheel comprises an inner plate 88 and an outer plate 90 of the same diameter and lying flat against one another. The two inner plates 88 abut opposite ends of the sleeve 86 on the shaft 20. The outer plates 90 are coaxially recessed to receive end portions of bosses 92 which are mounted as sleeves on the shaft 20. The bosses are prevented from rotation relative to the shaft by the heads of keying screws 94 which are engaged in a keyway 96 of the shaft. The outer plates 90 are secured to the bosses by means of axially extending screws 98 through the plates. The assembly of the inner and outer plates 88 and 90, the two bosses 92 and the spacing sleeve 86 is secured together by means of six axially-extending inner bolts 100 which extend through aligned holes in the four plates. The bolts 100 are uniformly distributed about the axis of the shaft 20, at 60° intervals on a common pitch circle. Each bolt 100 serves also to mount pivotally an elongate spoke-forming toggle plate 102, which extends radially outwards from the bolt 100. The bolt passes through a hole in an enlarged end portion of the toggle plate, the hole extending from side edge to side edge of the elongate plate; that is to say, the axis of the bolt 100 lies generally in the plane of the toggle plate. The side edges of the toggle plate 102 are maintained separated from the inner plates 88 of the treadwheel by means of spacing rings 104 on the bolt.

The indexing assembly comprises also two spring pawl bridges 106 and 108 (see also FIGS. 2 and 6) which extend from side to side of the shaft 20 over the two supporting wheels 82 and 84. The bridges 106 and 108 are secured down to the base 10 of the machine. The four inner and outer plates 88 and 90 of the two supporting wheels have identical axially-extending shallow 'V' recesses 110 formed in their peripheries. Each plate has six such recesses 110, formed at precisely 60° intervals about its axis, and the sets of six recesses in the four plates are aligned axially. Each of the two bridges 106 and 108 comprises a flat and level uppermost portion 112 through which a rectangular slot 114 extends. A retaining block 116 of latching means of the assembly is loosely accommodated in the slot. A lowermost portion of the block is V-shaped in axial cross-section, and is so arranged to engage in the recesses 110 of the wheels beneath it. The block is resiliently depressed into the recesses by means of a spring plate 118 which is secured down to an upper surface of the bridge, by means of screws 120, and bears down on a flat top surface of the block. The treadwheel is so arranged to be retained in stopped positions at 60° intervals of rotation by the retaining blocks 116.

The assembly comprises also six outer bolts 122 which, similarly to the inner bolts 100, extend in parallel with the shaft 20 through aligned holes in the four plates of the supporting wheels 82 and 84. The six outer bolts 122 are uniformly distributed about the axis of the shaft 20, at 60° intervals on a common pitch circle of greater diameter than that for the inner bolts 100. However, as seen best in FIG. 6, the inner and outer bolts 100 and 122 are not aligned radially of the treadwheels, but rather are displaced through a small angle. This displacement positions the outer bolts 122 to serve as stops for the toggle plates 102, which are pivotally mounted on the inner bolts 100 as hereinbefore described.

Figure 3:
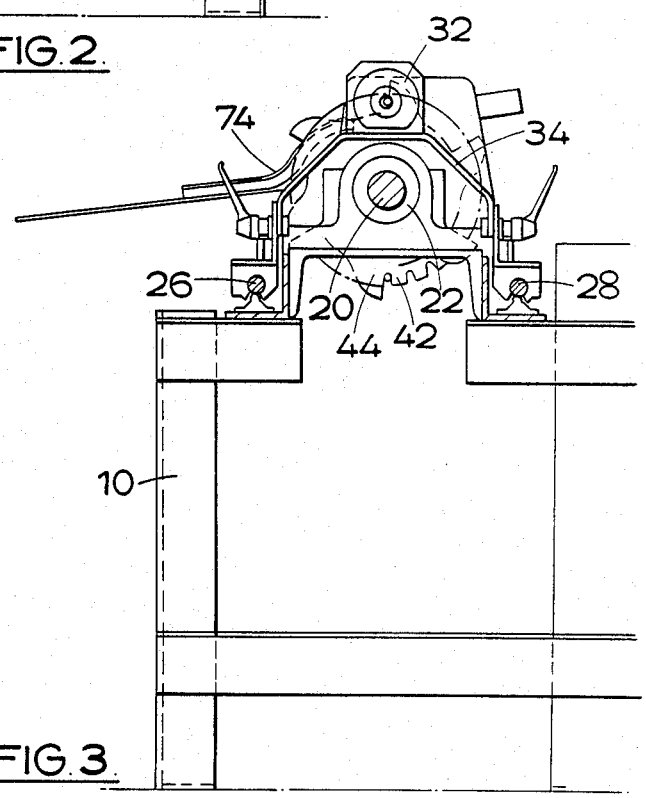
FIG. 3 is a schematic end view of Section III—III of FIG. 1.

The supporting wheels 82 and 84 are so orientated on the shaft 20 that when in their stopped positions (i.e. with the locating blocks 116 engaged with notches of the treadwheels) the feeding wheels 38 and 40 of the feeding assembly 16 are in position to hold a workpiece at the machining position (i.e. as shown in FIGS. 3, 5 and 6).

The required direction of rotation of the treadwheel, in order to rotate the feeding wheels 38 and 40 in the appropriate direction for feeding workpieces to the machining position, is indicated by an arrow on the wheel seen in FIG. 6. [FIGS. 5 and 6 are views in opposite directions along the machine.]. It is to be seen from FIG. 6 that with the treadwheel in its stopped position a next toggle plate 102', considered from a vertical centreline of the treadwheel in the direction against the direction of rotation of the treadwheel, hangs down from its securing bolt 100 to rest in an advanced position against the adjacent outer bolt 122; in that position the elongate toggle plate extends as a spoke substantially radially of the treadwheel. Actuating means comprising a pneumatic indexing cylinder 124 is mounted on the machine base 10, aligned horizontally and transversely of the axis of the shaft 20. The cylinder 124 is at a level to engage that next toggle plate, upon an actuating rod 126 of the cylinder being advanced, so to push the toggle and cause rotation of the treadwheel. A stop block 128 is positioned opposite the cylinder 124, and comprises an adjustable stop screw 130 to be engaged at the end of the required pushing stroke of the indexing cylinder 124. The stop screw 130 is adjusted so that each such stroke of the cylinder is effective to rotate the treadwheels through precisely 60°. The actuating rod 126 is then withdrawn, and the next toggle plate falls into position to be engaged when the rod is next advanced. The toggle plates 102 are free to fall backwards as the treadwheel continues to rotate, to rest in each case in a retracted position against the outer bolt 122 adjacent to the next toggle plate back (i.e. considered against the direction of rotation of the treadwheel). In that inclination the toggle plate projects a substantially reduced amount beyond the periphery of the treadwheel.

I claim:

1. In apparatus comprising a machining head for the automatic or semi-automatic removal of material from the ends of elongate workpieces such as lengths of wire, bar or tube, workpiece-transporting means comprising feeding means having a workpiece carrier arranged to carry a workpiece from storage and present it in a machining position at which the workpiece is held for one of its two ends to be machined by a tool mounted on the machining head, the carrier comprising a rotatable feeding wheel which has a plurality of peripheral workpiece-receiving notches which are uniformly distributed about the axis of the wheel and a plurality of workpiece-picking fingers which project radially adjacent to the notches for picking workpieces from storage and introducing them singly into the notches as the wheel rotates, and the transporting means comprising also indexing means arranged to cause rotation of the feeding wheel in uniform indexing steps in order to bring workpieces successively to the machining position.

2. Transporting means according to claim 1 in which the feeding wheel comprises a workpiece-positioning member which has the notches formed at its periphery and a picker member which provides the fingers, the positioning member having at its periphery a plurality of sets of such notches for handling workpieces of different thicknesses, each set being made up of notches of the same size and there being the same number of notches in each set, the picker member being rotationally adjustably secured to the positioning member in order that the fingers can be positioned adjacent to the notches of any selected one of the sets of notches.

3. Transporting means according to claim 2 in which the notches of the plurality of sets of notches are centered on a common pitch circle of the positioning member so that each notch is arranged for bringing a workpiece to the same machining position.

4. Transporting means according to claim 1 in which the carrier comprises at least two such feeding wheels mounted coaxially for rotation in common by means of the indexing means, in order to support each workpiece at axially spaced positions along its length.

5. Transporting means according to claim 4 comprising two oppositely-aligned machining heads which are so mounted as to permit relative movements of approach and separation to be effected between them in order that different lengths of workpiece presented between them in the machining position by the workpiece-feeding means can be accommodated, a feeding wheel being coupled to each of the machining heads in order that the spacing between those two feeding wheels is determined by the spacing between the machining heads.

6. Transporting means according to claim 1 in which the indexing means comprises a rotatably mounted treadwheel comprising a plurality of projecting spokes which are uniformly distributed about the axis of the treadwheel, there being the same number of spokes as there are workpiece-picking fingers of the or each feeding wheel of the carrier, and the indexing means comprising actuating means arranged to engage the spokes in turn to rotate the treadwheel in the uniform indexing steps between stopped positions coinciding with the presentation of workpieces in the machining position by the workpiece carrier.

7. Transporting means according to claim 6 in which the indexing means comprises latching means arranged to retain the treadwheel in the stopped position at the end of each of the indexing steps.

8. Transporting means according to claim 7 in which the latching means comprises a retaining member which is resiliently urged to engage in a recess in the periphery of the treadwheel in each of the stopped positions of the treadwheel.

9. Transporting means according to claim 6 in which each of the spokes is pivotally mounted in the treadwheel to swing about an axis parallel with the treadwheel axis between an advanced position in which it engages a stop enabling it to be acted upon by the actuating means to rotate the treadwheel and a retracted position to which it falls as the treadwheel continues to rotate and in which the extent of its projection radially of the treadwheel is reduced.

10. Transporting means according to claim 9 in which the spokes are pivotally mounted between two co-axial supporting wheels of the treadwheel, the supporting wheels being rotatably mounted for rotation of the treadwheel.

* * * * *